US011971734B2

(12) United States Patent
Zhang

(10) Patent No.: US 11,971,734 B2
(45) Date of Patent: Apr. 30, 2024

(54) LOW DROPOUT LINEAR REGULATOR AND CONTROL CIRCUIT THEREOF

(71) Applicant: SG MICRO CORP, Beijing (CN)

(72) Inventor: Lidi Zhang, Beijing (CN)

(73) Assignee: SG MICRO CORP, Beijing (CN)

( * ) Notice: Subject to any disclaimer, the term of this patent is extended or adjusted under 35 U.S.C. 154(b) by 210 days.

(21) Appl. No.: 17/787,350

(22) PCT Filed: Sep. 4, 2020

(86) PCT No.: PCT/CN2020/113558
§ 371 (c)(1),
(2) Date: Jun. 20, 2022

(87) PCT Pub. No.: WO2021/120703
PCT Pub. Date: Jun. 24, 2021

(65) Prior Publication Data

US 2023/0130733 A1 Apr. 27, 2023

(30) Foreign Application Priority Data

Dec. 19, 2019 (CN) ........................ 201911319296.2

(51) Int. Cl.
*G05F 1/573* (2006.01)
*G05F 1/575* (2006.01)
*G05F 3/26* (2006.01)

(52) U.S. Cl.
CPC ............ *G05F 1/5735* (2013.01); *G05F 1/575* (2013.01); *G05F 3/262* (2013.01)

(58) Field of Classification Search
CPC ......... G05F 1/575; G05F 1/5735; G05F 3/262
See application file for complete search history.

(56) References Cited

U.S. PATENT DOCUMENTS 4,326,245 A 4/1982 Saleh
8,552,703 B2 10/2013 Liu et al.
(Continued)

FOREIGN PATENT DOCUMENTS

CN 101527558 A 9/2009
CN 101976816 A 2/2011
(Continued)

OTHER PUBLICATIONS

International Search Report (including English translation) and Written Opinion for International Application No. PCT/CN2020/113558, dated Nov. 10, 2020, 9 pages.
(Continued)

*Primary Examiner* — Jue Zhang
(74) *Attorney, Agent, or Firm* — Westman, Champlin & Koehler, P.A.

(57) ABSTRACT

Disclosed is a low dropout linear voltage regulator and a control circuit thereof. The control circuit comprises an error amplifier, a foldback current-limiting protection circuit, an undershoot suppression circuit and an output detection circuit. The foldback current-limiting protection circuit limits the output current of power transistor and performs short circuit protection, the undershoot suppression circuit pulls the control terminal of the power transistor to low voltage level when the output voltage undershoots. The output detection circuit judges whether the output voltage rises to a preset voltage value in the startup stage, and before the output voltage rises to the preset voltage value, disables the undershoot suppression circuit and the foldback characteristic of the foldback current-limiting protection circuit, which can prevent normal startup of the circuit from being affected by a maloperation of the foldback current-limiting protection circuit and the undershoot suppression circuit during the startup process, improve on-load startup ability.

18 Claims, 7 Drawing Sheets

(56) References Cited

U.S. PATENT DOCUMENTS

| | | | | |
|---|---|---|---|---|
| 8,841,897 | B2 | 9/2014 | Williams et al. | |
| 2001/0017535 | A1* | 8/2001 | Inaba | G05F 1/575 323/274 |
| 2005/0275394 | A1 | 12/2005 | Moraveji et al. | |
| 2010/0213908 | A1 | 8/2010 | Chen | |
| 2012/0098513 | A1* | 4/2012 | Terada | G05F 1/5735 323/284 |
| 2012/0187930 | A1 | 7/2012 | Williams et al. | |
| 2012/0223687 | A1 | 9/2012 | Liu et al. | |
| 2015/0061622 | A1 | 3/2015 | Bhattad | |
| 2016/0043539 | A1* | 2/2016 | Mallala | G05F 1/573 361/18 |
| 2019/0220049 | A1* | 7/2019 | Qiu | H03F 3/45 |

FOREIGN PATENT DOCUMENTS

| | | | |
|---|---|---|---|
| CN | 102655370 | A | 9/2012 |
| CN | 103392159 | A | 11/2013 |
| CN | 204144918 | U | 2/2015 |
| CN | 104536507 | A | 4/2015 |
| CN | 106774580 | A | 5/2017 |
| CN | 107066019 | A | 8/2017 |
| CN | 110121685 | A | 8/2019 |
| CN | 209297188 | U | 8/2019 |
| JP | 2006318326 | A | 11/2006 |

OTHER PUBLICATIONS

First Office Action, including Search Report, for Chinese Patent Application No. 201911319296.2, dated Nov. 22, 2021, 18 pages.

* cited by examiner

LOW DROPOUT LINEAR REGULATOR AND CONTROL CIRCUIT THEREOF

CROSS-REFERENCES TO RELATED APPLICATION

This present application is a Section 371 National Stage Application of International Application No. PCT/CN2020/113558, filed on Sep. 4, 2020, and published as WO 2021/120703 A1, on Jun. 24, 2021, not in English, which claims priority to Chinese patent application No. 201911319296.2, filed on Dec. 19, 2019, entitled "LOW DROPOUT LINEAR REGULATOR AND CONTROL CIRCUIT THEREOF", the entire contents of which are incorporated herein by reference in their entireties.

FIELD OF THE DISCLOSURE

The present disclosure relates to a technical field of linear regulators, in particular to a low dropout linear regulator and a control circuit thereof.

DESCRIPTION OF THE RELATED ART

A low dropout regulator (LDO) is used to convert an unstable input voltage into an adjustable DC output voltage, which can be used as a power supply for another system. Because the linear voltage regulator has simple structure, low static power consumption and low output voltage ripple, it is often used for on-chip power management in chips of mobile consumer electronic devices.

FIG. 1 and FIG. 2 show schematic diagrams of a package and a circuit of a low dropout linear regulator according to the prior art, respectively. As shown in FIG. 1, the low dropout linear regulator according to the prior art includes an input pin IN, an enable pin EN, an output pin OUT, and a ground pin GND. The input pin IN is configured to receive a power supply voltage VCC, the enable pin EN is configured to receive an enable signal, and the output pin OUT is configured to provide an output voltage Vout to a post-stage load. When the enable pin EN is at high voltage level, the low dropout linear regulator can operate normally. When the enable pin EN is at low voltage level, the low dropout linear regulator is turned off and the voltage at the output pin OUT is pulled down to ground.

Further, as shown in FIG. 2, the low dropout linear regulator 100 includes a power transistor Mpout and an error amplifier 110. The power transistor Mpout is used for providing the output voltage Vout to a post-stage load in accordance with the power supply voltage VCC, which is supplied from a power supply terminal. The error amplifier 110 is configured to compare a feedback voltage VFB, which is obtained by sampling the output voltage Vout, with a reference voltage VREF to obtain an error signal between the feedback voltage VFB and the reference voltage VREF, and adjust a source-drain voltage drop of the power transistor Mpout according to the error signal, thereby stabilizing the output voltage Vout.

In practical uses of the low dropout linear regulator, events such as hot swap, sudden decrease of equivalent resistance of post-stage load or short circuit to ground at output may be encountered. Limited by a loop response speed, when one or more of these events occur, the output voltage of the chip may have a large overshoot or undershoot peak, moreover, due to abnormal situations such as overload and short circuit, an output current of the low dropout linear regulator may exceed a preset value for a long time, which leads to serious chip heating, accelerated device aging, and even a fire and other safety problems. Therefore, existing low dropout linear regulators with high current switches all include current-limiting protection circuits, which are used to limit sudden increase of the output current, so as to achieve constant current limitation, and protect a large-size power transistor and an upstream power supply inside the chip. However, when the constant current limitation occurs, an operating current in the circuit is still very large, and working with the large current for a long time will not only consume too much power, but also greatly reduce service life of the chip due to heating and other problems. Therefore, a current-limiting protection circuit with a foldback characteristic is usually used for short circuit protection. The foldback characteristic of the current-limiting protection circuit is that when the circuit is overloaded, a variation of the output voltage is fed back to the current limiting protection circuit, and a flip threshold value of current limiting protection is adjusted according to the feedback of the output voltage. Finally, the output current of the circuit is limited to a low value when the load is short-circuited, thus reducing power consumption of the chip and achieving a function of the current-limiting protection circuit when the load is short-circuited.

The existing low dropout linear regulator with the foldback current-limiting protection circuits have following problems: if the load of a subsequent stage is slightly greater than the current limit value under foldback characteristic of the current limit protection circuit, during power-on process of the circuit, the current limit protection circuit will mistakenly determine that short circuit occurs at the load at this time because the output voltage Vout is at low voltage level, and clamp the voltage Vgate at the control terminal of the power transistor Mpout to a certain value, resulting in the circuit being unable to startup normally.

In addition, FIG. 3 shows a circuit schematic diagram of another low dropout linear regulator according to the prior art. Because the loop response speed of LDO is slower than the changing speed of load current, the power transistor cannot be adjusted in time when there is an instantaneous large current change at load end, thus the voltage at the output terminal changes greatly, resulting in overshoot or undershoot. As shown in FIG. 3, the low dropout linear regulator 200 also includes a undershoot suppression circuit 220. The undershoot suppression circuit 220 includes a comparator 221 and a transistor Mn1. A non-inverting input terminal of the comparator 221 receives a reference voltage VREF, and an inverting input terminal receives a feedback voltage VFB via a voltage source which provides a preset voltage Vos. The transistor Mn1 is connected between a control terminal of the power transistor Mpout and ground, and the control terminal of the transistor Mn1 is connected to an output terminal of the comparator 221. When the feedback voltage VFB is equal to the reference voltage VREF, the comparator 221 outputs a low-level voltage and the transistor Mn1 is turned off. When a circuit undershoot event occurs, the feedback voltage VFB is lower than a voltage difference between the reference voltage VREF and the preset voltage Vos, the comparator 221 outputs a high level voltage, the transistor Mn1 is turned on, and the control terminal voltage Vgate of the power transistor Mpout is pulled to low voltage level, and the power transistor Mpout pulls the output voltage Vout to high voltage level, thereby realizing undershoot suppression.

However, the low dropout linear regulator in FIG. 3 also has some disadvantages: during the power-on process of the circuit, because the output voltage Vout is at low voltage level, the undershoot suppression circuit 220 may mistakenly determine that an output voltage undershoot event occurs at this time, and pull the voltage at the control terminal of the power transistor Mpout to low voltage level. Because the loop with the error amplifier has not been setup at this time, the output current will increase when the control terminal voltage of the power transistor Mpout maintains at a low voltage potential for a long time, and overshoot will occur on the output voltage in some application circuits with light loading.

Therefore, it is necessary to improve the existing low dropout linear regulator comprising a foldback current-limiting protection circuit and an undershoot suppression circuit, so that it can startup normally during the power-on process.

SUMMARY OF THE DISCLOSURE

In view of the above problems, an objective of the present disclosure is to provide a low dropout linear voltage regulator and a control circuit thereof, which can normally startup during a power-on process, has an improved on-load startup ability of the circuit.

According to an aspect of an embodiment of the present disclosure, a control circuit of a low dropout linear voltage regulator is provided. The low dropout linear voltage regulator comprises a power transistor connected between a power supply terminal and an output terminal, the control circuit is used for driving the power transistor to convert a power supply voltage at the power supply terminal into an output voltage, wherein, the control circuit comprises: an error amplifier, configured to drive the power transistor according to a voltage difference between a feedback voltage of the output voltage and a reference voltage; a foldback current-limiting protection circuit, connected with a control terminal of the power transistor for performing foldback control on an output current of the power transistor and short circuit protection according to the output voltage; an undershoot suppression circuit, connected with the control terminal of the power transistor for pulling a voltage at the control terminal of the power transistor to low voltage level when the output voltage undershoots; and an output detection circuit, configured to judge whether the output voltage rises to a preset voltage value in a startup stage, and disable the undershoot suppression circuit and the foldback control performed by the foldback current-limiting protection circuit before the output voltage rises to the preset voltage value.

In some embodiments, the foldback current-limiting protection circuit is configured to perform foldback control on a current-limiting threshold value according to a current-limiting foldback control signal in valid state and the output voltage when an input current flowing through the power transistor is greater than the current-limiting threshold value, so as to limit the output current to a lower current value.

In some embodiments, the undershoot suppression circuit is configured to generate the undershoot suppression signal in valid state when the feedback voltage is lower than a voltage limiting threshold value, and pull the voltage at the control terminal of the power transistor to low voltage level according to the undershoot suppression signal in valid state.

In some embodiments, the output detection circuit is configured to maintain the current-limiting foldback control signal and the undershoot suppression signal in invalid state before the output voltage rises to the preset voltage value.

In some embodiments, the output detection circuit comprises: a reset signal generating module, configured to generate a reset signal according to the power supply voltage and a reference voltage; a comparison module, configured to compare the feedback voltage of the output voltage with the preset voltage value to obtain a comparison result, and generate a comparison signal according to that comparison result; a logic module, configured to generate a clock signal according to the comparison signal; a control module, configured to perform a set operation according to the clock signal and a reset operation according to the reset signal, so as to generate a logic control signal, and control states of the current-limiting foldback control signal and the undershoot suppression signal according to the logic control signal.

In some embodiments, the reset signal generation module comprises: a first transistor, a second transistor and a first resistor sequentially connected in series between the power supply terminal and the ground; a third transistor and a fourth transistor sequentially connected in series between the power supply terminal and the ground; and a first inverter, wherein the first transistor and the third transistor form a current mirror, a control terminal of the second transistor is grounded, a control terminal of the fourth transistor is used for receiving the reference voltage, an input terminal of the first inverter is connected with a first current terminal of the fourth transistor, and an output terminal of the first inverter is used for providing the reset signal.

In some embodiments, the comparison module comprises a fifth transistor and a sixth transistor sequentially connected in series between the power supply terminal and the ground, wherein the fifth transistor forms a current mirror with the first transistor and the third transistor, a control terminal of the sixth transistor is used for receiving the feedback voltage, and an intermediate node of the fifth transistor and the sixth transistor is used for providing the comparison signal, wherein the preset voltage value is equal to a turn-on threshold value of the sixth transistor.

In some embodiments, the logic module comprises second to fourth inverters sequentially connected in series, wherein an input terminal of the second inverter is connected to an intermediate node of the fifth transistor and the sixth transistor to receive the comparison signal, and an output terminal of the fourth inverter is used for providing the clock signal.

In some embodiments, the control module comprises: a flip-flop, having an input terminal used for receiving the power supply voltage, a clock terminal used for receiving the clock signal, a reset terminal used for receiving the reset signal, and an output terminal used for outputting the logic control signal; a seventh transistor, having a control terminal used for receiving the logic control signal, a first current terminal connected with the undershoot suppression circuit, and a second current terminal which is grounded; and an eighth transistor, having a control terminal used for receiving the logic control signal, a first current terminal connected to the foldback current-limiting protection circuit, and a second current terminal which is grounded, wherein the seventh transistor in turn-on state and the eighth transistor in turn-on state are used for grounding the undershoot suppression signal and the current-limiting foldback control signal, respectively.

In some embodiments, the output detection circuit further comprises a ninth transistor, having a control terminal connected to the output terminal of the flip-flop to receive the logic control signal, a first current terminal connected to the power supply terminal, and a second current terminal connected to an output terminal of the second inverter.

In some embodiments, the first transistor, the third transistor, the fifth transistor and the ninth transistor are metal oxide semiconductor field effect transistors of P type, the second transistor, the fourth transistor, the sixth transistor, the seventh transistor, and the eighth transistor are metal oxide semiconductor field effect transistors of N type, respectively.

In some embodiments, the foldback current-limiting protection circuit comprises: a sampling transistor, configured to obtain a current sampling signal according to the input current; a current comparison module, configured to compare the current sampling signal with a reference signal representing the current-limiting threshold value to obtain a comparison result, and obtain a current detection signal according to the comparison result; a foldback control module, configured to adjust the reference signal according to the output voltage; an overcurrent protection transistor, configured to control the voltage at the control terminal of the power transistor according to the current detection signal; and an enabling control module, configured to control an operating state of the foldback control module according to the current-limiting foldback control signal, wherein, when the current-limiting foldback control signal is in invalid state, the enabling control module is configured to disable the foldback control module according to the current-limiting foldback control signal in invalid state.

In some embodiments, the foldback current-limiting protection circuit further comprises a bias module, configured to provide a bias current for the current comparison module.

In some embodiments, the current comparison module comprises: tenth to fourteenth transistors, a second resistor and a third resistor, wherein the tenth transistor and the eleventh transistor form a current mirror, first current terminals of the tenth transistor and the eleventh transistor are connected to a second terminal of the third resistor, a first terminal of the third resistor is connected with the power supply voltage, a first current terminal of the twelfth transistor is connected to a second current terminal of the tenth transistor, a control terminal of the twelfth transistor is connected with a second terminal of the second resistor, a first terminal of the second resistor is connected with the power supply voltage, an intermediate node of the second resistor and the twelfth transistor is connected to the sampling transistor to receive the current sampling signal, a first current terminal of the thirteenth transistor is connected to a second current terminal of the eleventh transistor, a control terminal of the thirteenth transistor is connected with a first current terminal of the eleventh transistor, the first current terminal of the thirteenth transistor is configured to provide the current detection signal, second current terminals of the twelfth transistor and the thirteenth transistor are both connected to a first current terminal of the fourteenth transistor, a second current terminal of the fourteenth transistor is grounded, and the fourteenth transistor is configured to obtain the bias current through a mirror structure.

In some embodiments, the foldback control module comprises a fifteenth transistor and a sixteenth transistor connected in series between the second current terminal of the thirteenth transistor and ground, wherein, a control terminal of the fifteenth transistor is configured to receive the output voltage, and the sixteenth transistor obtains the bias current through a mirror structure.

In some embodiments, the enabling control module comprises: a seventeenth transistor and a first current source connected in series between the power supply voltage and ground, and a control terminal of the seventeenth transistor is configured to receive the current-limiting foldback control signal; an eighteenth transistor connected in parallel with the fifteenth transistor, a control terminal of the eighteenth transistor being connected to an intermediate node of the seventeenth transistor and the first current source; and a second current source, having a first terminal connected to the power supply voltage, and a second terminal connected to the control terminal of the seventeenth transistor.

In some embodiments, the tenth transistor, the eleventh transistor, and the seventeenth transistor are metal oxide semiconductor field effect transistors of the P type, respectively, and the twelfth to sixteenth transistors and the eighteenth transistor are metal oxide semiconductor field effect transistors of the N type, respectively.

According to another aspect of embodiments of the present disclosure, a low dropout linear voltage regulator is provided, and comprises: a power transistor connected in series between the power supply terminal and the output terminal; the control circuit according to any control circuit of the embodiments of the present disclosure, configured to drive the power transistor to convert the power supply voltage at the power supply terminal into the output voltage.

The low dropout linear regulator and the control circuit of the low dropout linear regulator according to embodiments of the present disclosure have following advantages.

The control circuit comprises an error amplifier, a foldback current-limiting protection circuit, an undershoot suppression circuit and an output detection circuit. The foldback current-limiting protection circuit is used for limiting the output current of the power transistor and perform short circuit protection, and the undershoot suppression circuit is used for grounding the control terminal of the power transistor when the output voltage undershoots.

Wherein, the output detection circuit is configured to judge whether the output voltage rises to a preset voltage value in the startup stage, and before the output voltage rises to the preset voltage value, the output detection circuit is configured to disable the undershoot suppression circuit and the foldback characteristic of the foldback current-limiting protection circuit, which not only prevents the normal startup of the circuit from being affected by maloperations of the folding current-limiting protection circuit and the undershoot suppression circuit during the startup process of the circuit, but also avoids the maloperation of the output detection circuit being caused by fluctuation of the output voltage when the circuit is normally operated, thus ensuring that the foldback current-limiting protection circuit and the undershoot suppression circuit can be started up normally in normal operating process of the chip, with high circuit stability and strong on-load startup ability.

BRIEF DESCRIPTION OF THE DRAWINGS

The above and other objectives, advantages and features of the present invention will become more fully understood from the detailed description given hereinbelow in connection with the appended drawings, and wherein.

DETAILED DESCRIPTION OF EMBODIMENTS OF THE DISCLOSURE

Figure 1:
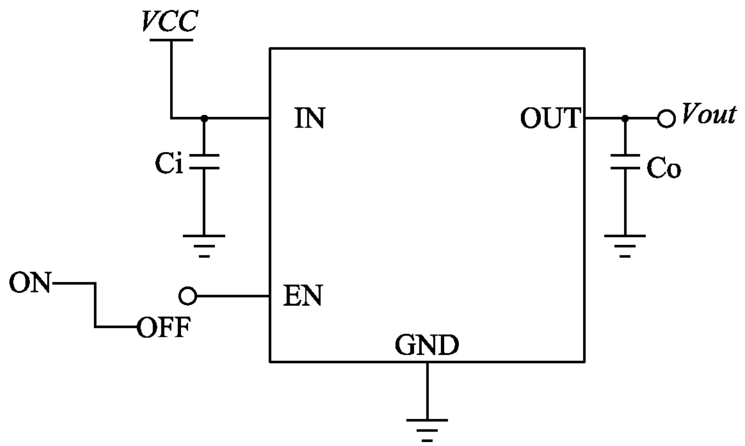
FIG. 1 shows a package schematic diagram of a low dropout linear regulator according to the prior art.
Figure 2:
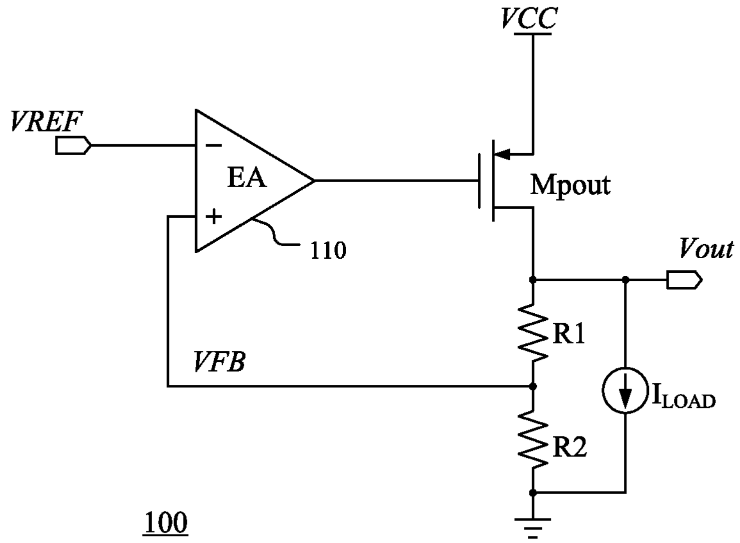
FIG. 2 shows a circuit diagram of a low dropout linear regulator according to the prior art.
Figure 3:
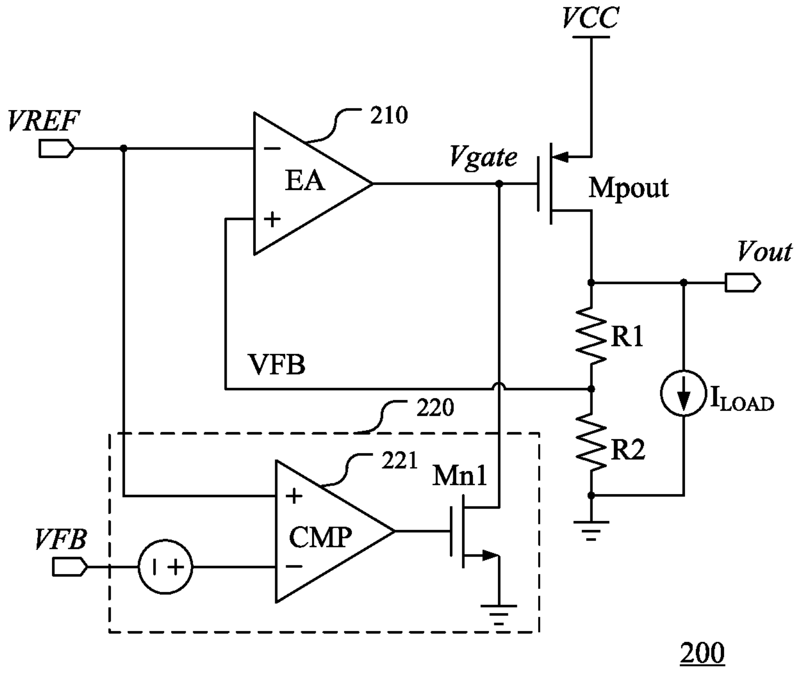
FIG. 3 shows a circuit diagram of another low dropout linear regulator according to the prior art.

Various embodiments of the present disclosure will be described in more detail below with reference to the accompanying drawings. In various drawings, the same elements are denoted by the same or similar drawing symbols. For the sake of clarity, various parts in the drawings are not drawn to scale.

It should be understood that, in the following description, "circuit" refers to a conductive circuit formed by at least one element or sub-circuit through electrical or electromagnetic connection. When an element or circuit is referred to as being "connected to"/"coupled to" another element or an element/circuit is "connected"/"coupled" between two nodes, it can be directly coupled or connected to another element or an intermediate element may be present, and the elements may be connected physically, logically, or both. Instead, when an element is referred to as being "directly coupled to" or "directly connected to" another element, it is meant that there is no intermediate element present between the elements.

In the present disclosure, a power transistor is a transistor operating in a linear mode to provide a current path, and can be implemented as a bipolar transistor or a field effect transistor. A first current terminal and a second current terminal of the power transistor respectively serve as a high potential terminal and a low potential terminal on the current path, and a control terminal of the power transistor is used to receive a driving signal, which is used for controlling a voltage drop of the power transistor. The power transistor can be a P-type MOSFET or an N-type MOSFET. The first current terminal, the second current terminal and the control terminal of the P-type MOSFET are a source, a drain and a gate, respectively, and the first current terminal, the second current terminal and the control terminal of the N-type MOSFET are a drain, a source and a gate, respectively.

The present disclosure is further explained below with reference to the accompanying drawings and embodiments.

Figure 4:
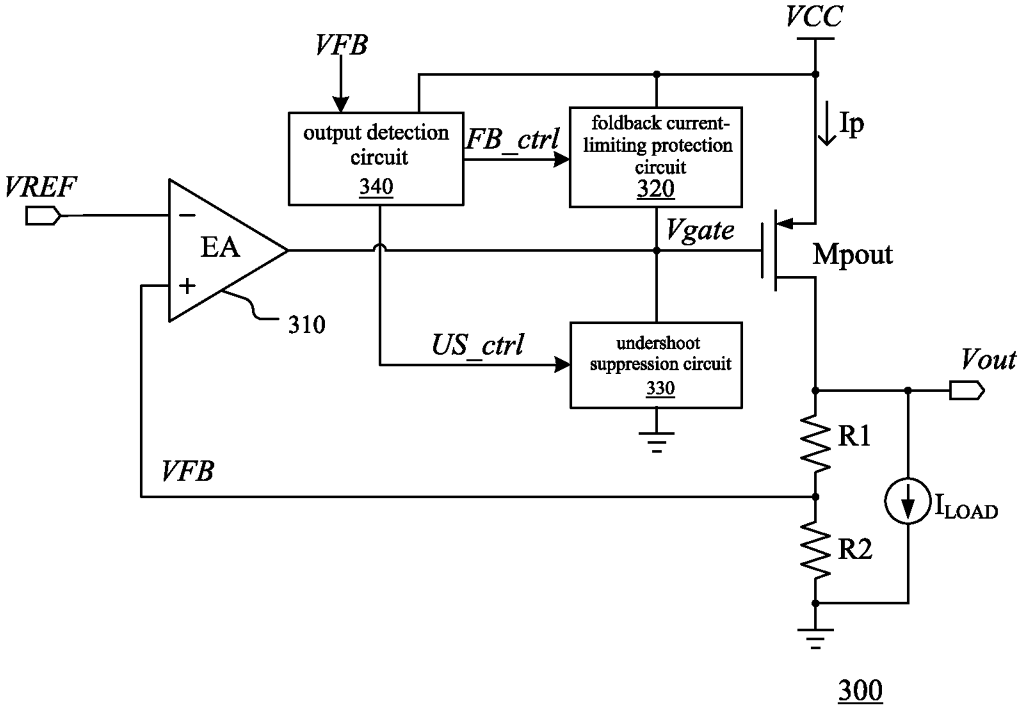
FIG. 4 shows a circuit diagram of a low dropout linear regulator according to an embodiment of the present disclosure.

FIG. 4 shows a circuit diagram of a low dropout linear regulator according to an embodiment of the present disclosure. As shown in FIG. 4, a low dropout linear regulator 300 comprises a power transistor Mpout and a control circuit integrated in a same integrated circuit chip. The power transistor Mpout is a main output transistor of the chip, and is connected between a power supply terminal and an output terminal. The power transistor Mpout, for example, is a P-type MOSFET, having a first current terminal for receiving the power supply voltage VCC, and a second current terminal for supplying an output voltage Vout to a load at a subsequent stage.

In some other embodiments, the power transistor Mpout may also be selected from a group comprising NPN Darlington transistors, NPN-type bipolar transistors, PNP-type bipolar transistors, or N-type MOSFETs, etc.

The control circuit is used to drive the power transistor Mpout, so that the power transistor Mpout can supply a load current $I_{LOAD}$ to the load at the subsequent stage.

Specifically, the control circuit comprises an error amplifier 310, a foldback current-limiting protection circuit 320, a undershoot suppression circuit 330 and an output detection circuit 340.

The error amplifier 310 is configured to control an on-resistance between the first current terminal and the second current terminal of the power transistor Mpout by controlling a voltage at the control terminal of the power transistor Mpout, thereby controlling the source-drain voltage drop of the power transistor Mpout.

Further, the error amplifier 310 is configured to compare the output voltage Vout with a reference voltage VREF. And when a deviation occurs between the output voltage Vout and the reference voltage VREF, the error amplifier 310 is configured to amplify the deviation and control the source-drain voltage drop of the power transistor Mpout by use of the amplified deviation. In this embodiment, when the output voltage Vout decreases, a voltage difference between the output voltage Vout and the reference voltage VREF increases, so that the voltage applied to the control terminal of the power transistor Mpout is increased, the on-resistance between the first current terminal and the second current terminal of the power transistor Mpout is reduced, and the voltage drop across the power transistor Mpout is reduced, thus a voltage at the output terminal of the low dropout linear regulator 300 can be increased, and the output voltage Vout is restored to a normal voltage level.

In some other embodiments of the present disclosure, the low dropout linear regulator 300 further comprises a feedback network connected between the output terminal and ground, and the error amplifier 310 is configured to control the source-drain voltage drop of the power transistor Mpout according to a voltage difference between a feedback voltage provided by the feedback network and the reference voltage. As an example, the low dropout linear regulator 300 comprises a resistor R1 and a resistor R2 connected in series between an output terminal of the power transistor Mpout and ground, and an intermediate node of the resistor R1 and the resistor R2 provides the feedback signal VFB of the output voltage Vout.

The foldback current-limiting protection circuit 320 is used to limit the output current of the power transistor Mpout and to provide short circuit protection. In one embodiment, the foldback current-limiting protection circuit 320 is configured to compare an input current Ip flowing through the power transistor Mpout with a current-limiting threshold value. When the input current Ip is greater than the current-limiting threshold value, the foldback current-limiting protection circuit 320 clamps the output current to a preset current by controlling the voltage at the control terminal of the power transistor Mpout, so that the current flowing through the power transistor Mpout can maintain constant when the output terminal of the chip is connected with a heavy load, thus reducing risks of damage on the chip and the load at the subsequent stage. The foldback characteristic of foldback current-limiting protection circuit is that, when the circuit is overloaded, a change on the output voltage is fed back to the current-limiting protection circuit, and a flip threshold value of current-limiting protection is adjusted according to the feedback of the output voltage. Finally, the output current of the circuit is limited to a lower current value when the load is short-circuited, thus reducing power consumption of the chip and achieving circuit protection when the load is short-circuited.

The undershoot suppression circuit 330 is configured to pull down the voltage at the control terminal of the power transistor Mpout when undershoot occurs on the output voltage Vout. In one embodiment, the undershoot suppression circuit 330 is used for generating an undershoot suppression signal US_ctrl (undershoot control) in valid state when the feedback voltage VFB is less than a voltage limiting threshold value, and grounding the control terminal of the power transistor Mpout according to the undershoot suppression signal US_ctrl in valid state, thereby effectively suppressing the undershoot of the output voltage when a load current changes.

The output detection circuit 340 is configured to judge whether the output voltage Vout rises to a preset voltage value in a startup stage, and disable the undershoot suppression circuit 330 and the foldback characteristic of the foldback current-limiting protection circuit 320 before the output voltage Vout rises to the preset voltage value, so as to prevent the current-limiting value of the foldback current-limiting protection circuit 320 from reducing and prevent normal startup of the circuit from being affected by a maloperation of the undershoot suppression circuit 330 during startup process of the circuit. In one embodiment, the output detection circuit 340 is used to maintain the current-limiting control signal FB_ctrl and the undershoot suppression signal US_ctrl in invalid state before the output voltage Vout rises to the preset voltage value, so as to prevent normal startup of the circuit from being affected by a maloperation of the undershoot suppression circuit 330 and the foldback current-limiting protection circuit 320.

It should be noted that, the current-limiting foldback control signal FB_ctrl and the undershoot suppression circuit US_ctrl shown in FIG. 4 are actually control signals generated inside the foldback current-limiting protection circuit 320 and the undershoot suppression circuit 330, respectively, and their reference numerals are placed outside the foldback current-limiting protection circuit 320 and the undershoot suppression circuit 330 for convenience of explanation. Those skilled in the art should understand that, the current-limiting foldback control signal FB_ctrl and the undershoot suppression circuit US_ctrl are not signals generated by the output detection circuit 340.

Figure 5:
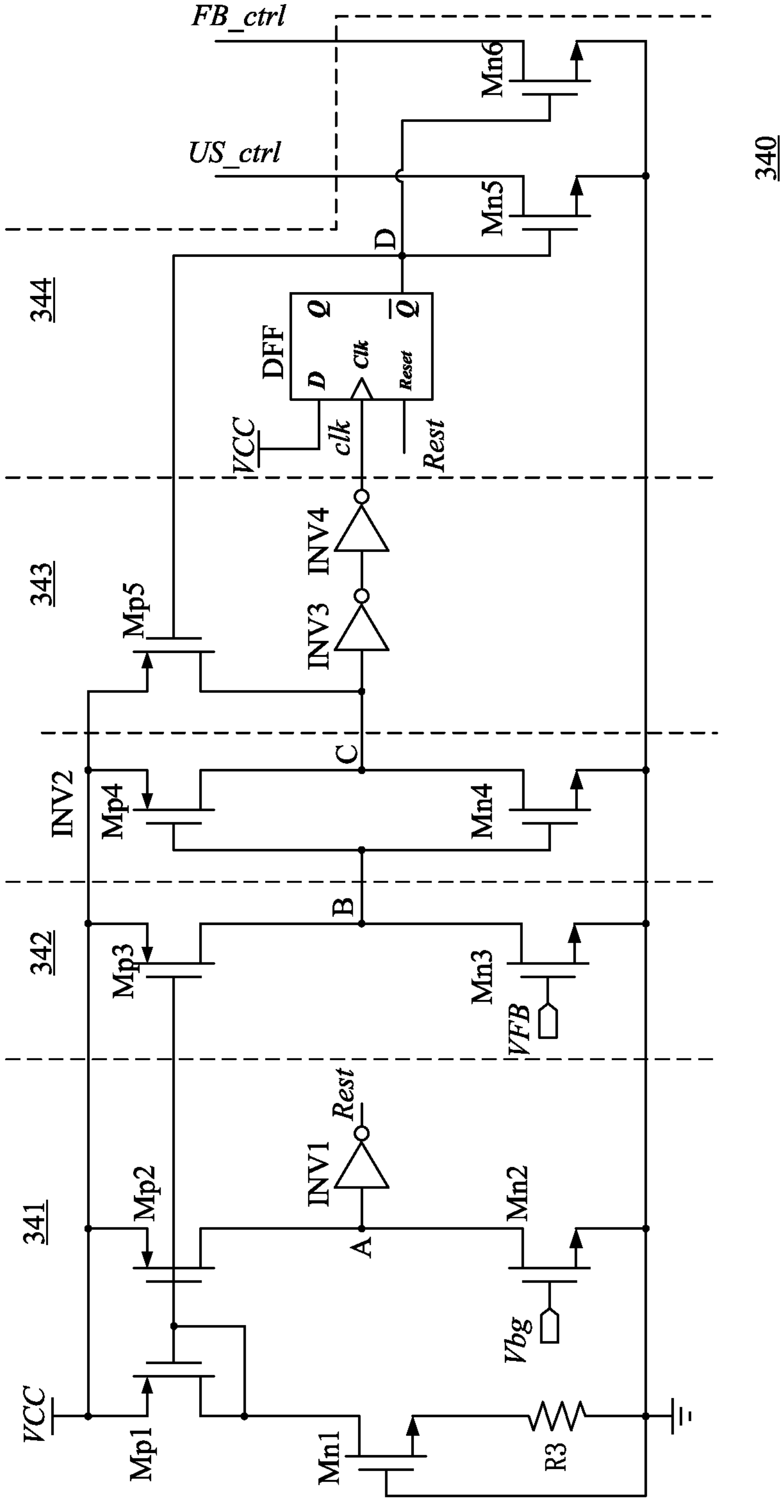
FIG. 5 shows a circuit diagram of an example of the output detection circuit in the low dropout linear regulator as shown in FIG. 4.

FIG. 5 shows a circuit diagram of an example of the output detection circuit in the low dropout linear regulator as shown in FIG. 4. As shown in FIG. 5, the output detection circuit 340 comprises a reset signal generation module 341, a comparison module 342, a logic module 343 and a control module 344.

The reset signal generation module 341 is used for generating a reset signal Rest according to the power supply voltage VCC and a reference voltage Vbg and for supplying a bias current to the comparison module 342. Further, the reset signal generation module 341 comprises: transistors Mp1 and Mp2, transistors Mn1 and Mn2, a resistor R3 and an inverter INV1. The transistor Mp1, the transistor Mn1 and the resistor R3 are sequentially connected in series between the power supply terminal and the ground, and the transistor Mp2 and the transistor Mn2 are sequentially connected in series between the power supply terminal and the ground. The transistor Mp1 and the transistor Mp2 form a current mirror, that is, control terminals of the transistor Mp1 and the transistor Mp2 are connected together to a second current terminal of the transistor Mp1. A control terminal of the transistor Mn1 is grounded and a control terminal of the transistor Mn2 is used for receiving the reference voltage Vbg. An input terminal of the inverter INV1 and a first current terminal of the transistor Mn2 are connected to node A, and a second terminal of the inverter INV1 is used for outputting the reset signal Rest. When the circuit starts to be powered on or be enabled, the transistor Mp1 starts to setup current according to the power supply voltage VCC, and the transistor Mp2 will also have current flowing through due to a mirror structure. The reference voltage Vbg at the control terminal of the transistor Mn2 is, for example, half of a band gap reference voltage, and since a setup speed of the band gap reference voltage may be slower than a setup speed of the current flowing through the transistor Mp1, a voltage VA at node A is at high voltage level when the circuit starts to be powered on, and the corresponding reset signal Rest is at low voltage level when the circuit starts to be powered on. When the band gap reference voltage has been setup, the transistor Mn2 is turned on, which pulls the voltage VA at node A to low voltage level, and the reset signal Rest is flipped to high voltage level.

The comparison module 342 is configured to compare the feedback voltage VFB with a preset voltage value to obtain a comparison result and generate a comparison signal according to the comparison result. Further, the comparison module 342 comprises a transistor Mp3 and a transistor Mn3 sequentially connected in series between the power supply terminal and the ground. The transistor Mp3 forms a current mirror with the transistors Mp1 and Mp2. A control terminal of the transistor Mn3 is used for receiving the feedback voltage VFB, and node B between the transistor Mp3 and the transistor Mn3 is used for providing the comparison signal. The transistor Mp3 and the transistor Mn3 form a voltage comparator, and when the feedback voltage VFB is lower than a turn-on threshold value of the transistor Mn3, the transistor Mn3 is turned off and the comparison signal VB output from the voltage comparator is at high voltage level; when the feedback voltage VFB is higher than the turn-on threshold value of the transistor Mn3, the transistor Mn3 is turned on, and the comparison signal VB output by the voltage comparator is flipped to low voltage level.

The logic module 343 is configured to generate a clock signal clk according to the comparison signal VB. The logic module 343 comprises an inverter INV2, an inverter INV3, and an inverter INV4 that are sequentially connected in series. An input terminal of the inverter INV2 is connected to node B to receive the comparison signal VB and an output terminal of the inverter INV4 is used to provide the clock signal clk. Further, the inverter INV2 comprises a transistor Mp4 and a transistor Mn4 connected in series between the power supply terminal and the ground, control terminals of the transistor Mp4 and the transistor Mn4 are connected together to node B, and node C between the transistor Mp4 and the transistor Mn4 is connected to an input terminal of the inverter INV3. Further, a size ratio of the transistor Mp4 and the transistor Mn4 may be 3:1. When the comparison signal VB is at high voltage level, a voltage VC at node C is at low voltage level, and the clock signal clk is at low voltage level; when the comparison signal VB is at low voltage level, the voltage VC at node C is at high voltage level and the clock signal clk is at high voltage level.

The control module 344 is configured to perform a set operation according to the clock signal clk and a reset operation according to the reset signal Rest, thereby generating a logic control signal, and control states of the current-limiting foldback control signal FB_ctrl and the undershoot suppression signal US_ctrl according to the logic control signal. Further, the control module 344 comprises a flip-flop DFF, a transistor Mn5 and a transistor Mn6. The flip-flop DFF is realized by, for example, a D flip-flop with an input terminal for receiving the power supply voltage VCC, a clock terminal for receiving the clock signal clk, a reset terminal for receiving the reset signal Rest, and an output terminal Q for outputting the logic control signal VD. Control terminals of the transistor Mn5 and the transistor Mn6 and the output terminal Q of the flip-flop DFF are connected to node D to receive the logic control signal VD. The first current terminal of the transistor Mn5 is connected to the undershoot suppression circuit, and the second current terminal is grounded. The first current terminal of the transistor Mn6 is connected to the foldback current-limiting protection circuit, and the second current terminal is grounded. The reset terminal of the flip-flop DFF is active low, for example, when the reset signal Rest is at low voltage level, whatever the state of the clock signal clk is, an output terminal Q of the flip-flop DFF outputs a low-level voltage and the output terminal Q outputs a high-level voltage. Therefore, when the reset signal Rest and the clock signal clk are at low voltage level, the logic control signal VD is at high voltage level, the transistor Mn5 and the transistor Mn6 are turned on, and the undershoot suppression signal US_ctrl and the current-limiting foldback control signal FB_ctrl are pulled down to ground, respectively; when the reset signal Rest is at high voltage level, the flip-flop DFF is configured to transmits the power supply voltage VCC at the input terminal to the output terminal Q when a rising edge of the clock signal clk occurs, so that the output terminal Q outputs a high level voltage and the output terminal Q outputs a low level voltage, that is, the logic control signal VD is at low voltage level, and the transistors Mn5 and Mn6 are turned off.

In a further embodiment, the output detection circuit 340 further comprises a transistor Mp5, having a control terminal connected to the output terminal Q of the flip-flop DFF, a first current terminal connected to the power supply terminal to receive the power supply voltage VCC, and a second current terminal connected with the output terminal of the inverter IN2 together at node C. Further, a size ratio of the transistor Mp5 to the transistor Mn4 can be 16:1. When the circuit operates normally and the logic control signal VD is at low voltage level, the transistor Mp5 is turned on to pull the voltage VC at node C to high voltage level, the clock signal clk is then pulled to high voltage level, at this time, even if the transistor Mn4 may be turned on due to a fluctuation of the output voltage Vout, the transistor Mn4 can't pull the voltage VC at node C to low voltage level, thus avoiding the clock signal clk being pulled down due to the fluctuation of the output voltage Vout when the circuit operates normally, preventing a maloperation of the output detection circuit from occurring, so that the foldback current-limiting protection circuit and the undershoot suppression circuit can be started up normally in normal operating process of the chip.

Figure 6:
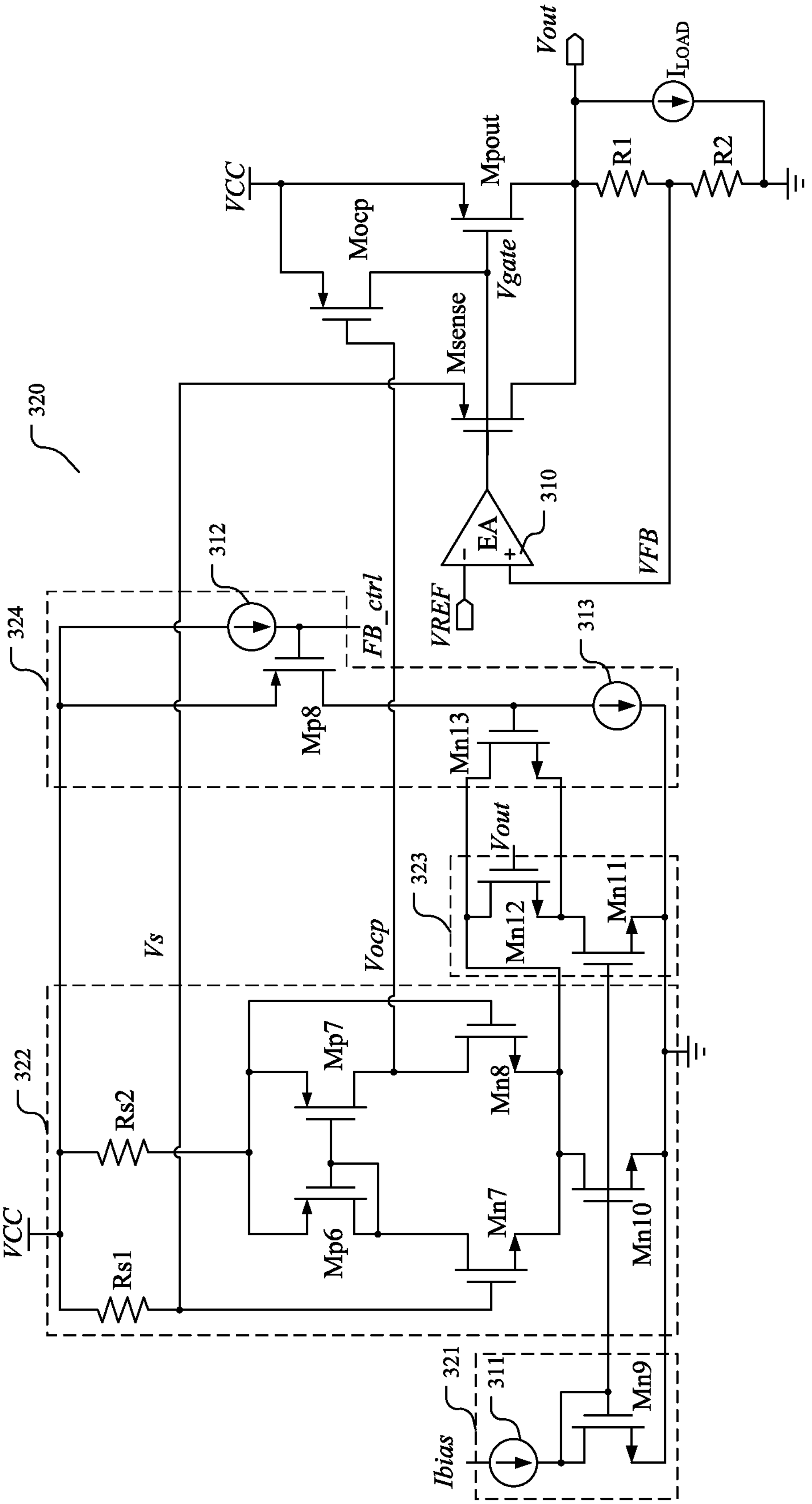
FIG. 6 shows a circuit diagram of an example of the foldback current-limiting protection circuit in the low dropout linear regulator shown in FIG. 4.

FIG. 6 shows a circuit schematic diagram of an example of the foldback current-limiting protection circuit in the low dropout linear regulator as shown in FIG. 4. As shown in FIG. 6, the foldback current-limiting protection circuit 320 comprises a sampling transistor Msense, an overcurrent protection transistor Mocp, a bias module 321, a current comparison module 322, a foldback control module 323 and an enable control module 324.

The sampling transistor Msense is used to obtain a current sampling signal proportional to a current flowing through the power transistor Mpout.

The current protection module 322 is configured to compare the current sampling signal with a reference signal representing the current-limiting threshold value, and obtain a current detection signal according to the comparison result. Further, the current comparison module 322 comprises a resistor Rs1, a resistor Rs2, transistors Mp6 and Mp7, and transistors Mn7, Mn8, Mn10. The resistor Rs1 and the sampling transistor Msense are sequentially connected in series between the power supply voltage VCC and the output terminal of the power transistor Mpout for obtaining the current sampling signal proportional to the current flowing through the power transistor Mpout. Transistor Mp6, transistor Mp7, transistor Mn7, and transistor Mn8 form a current comparator. The transistor Mn7 and the transistor Mn8 form a differential transistor pair, and second current terminals of the transistor Mn7 and the transistor Mn8 are connected to each other. A first current terminal of the transistor Mn7 is connected to a second current terminal of the transistor Mp6, a first current terminal of the transistor Mn8 is connected to a second current terminal of the transistor Mp7, a control terminal of the transistor Mn7 is connected to an intermediate node of the resistor Rs1 and the sampling transistor Msense, and a control terminal of the transistor Mn8 is connected to a first current terminal of the transistor Mp7. The transistor Mp6 and the transistor Mp7 form a current mirror, and the first current terminals of both the transistor Mp6 and the transistor Mp7 are connected to a second terminal of the resistor Rs2, and a first terminal of the resistor Rs2 is connected to the power supply voltage VCC.

The overcurrent protection transistor Mocp is used for controlling the voltage at the control terminal of the power transistor according to the current detection signal. Further, a first current terminal of the overcurrent protection transistor Mocp is connected to the power supply voltage VCC, and a second current terminal of the overcurrent protection transistor Mocp is connected to the control terminal of the power transistor Mpout, a control terminal of the overcurrent protection transistor Mocp is connected to the first current terminal of the transistor Mn8 to receive the current detection signal. When the current flowing through the power transistor Mpout is within a normal range, the sampling current flowing through the sampling transistor Msense is relatively small, and a voltage drop on the resistor Rs1 is low, so the current comparator can output a high level voltage, the overcurrent protection transistor Mocp can be turned off, and the chip operates normally; when the load is short-circuited or overloaded, the current flowing through the power transistor Mpout increases, the sampling current flowing through the sampling transistor Msense will also increase, a voltage at a non-inverting input terminal of the current comparator decreases gradually. When the voltage at a non-inverting input terminal of the current comparator decreases to reach the flip threshold value, the current comparator may output a low-level voltage, and the overcurrent protection transistor Mocp can be turned on, which pulls the voltage Vgate at the control terminal of the power transistor Mpout to high voltage level and limits the gate-source voltage of the power transistor Mpout to a certain value, thus achieving constant current limitation.

The bias module 321 is configured to provide a bias current to the current comparison module 322. Further, the bias module 321 comprises a current source 311 and a transistor Mn9, and a branch formed by the current source 311 and the transistor Mn9 are used for supplying the bias current to rest portions of the circuit in accordance with the current Ibias. The transistor M10 and the transistor Mn9 form a current mirror for providing the bias current to the current comparison module based on the mirror structure.

However, when constant current limitation occurs, an operating current in the circuit may still be very large. Keeping operating with large current for a long time will not only consume too much power, but also greatly reduce service life of the chip due to heating and other problems. Therefore, it is necessary to further introduce a feedback loop between the output voltage and the current-limiting protection circuit to realize foldback current-limiting protection. A principle of foldback current-limiting protection is that when the circuit is overloaded, a change on the output voltage is fed back to the current-limiting protection circuit, and with the continuous decrease of output voltage, the flip threshold value of the current comparator is controlled to change, and finally the output current of the circuit is limited to a smaller current value when the load is short-circuited, thus realizing functions of reducing chip power consumption and protecting the circuit when short-circuited. As shown in FIG. 6, the foldback control module 323 is configured to adjust the reference signal of the current-limiting threshold value according to the output voltage Vout, to realize the foldback current-limiting protection.

Further, the foldback control module 323 comprises a transistor Mn11 and a transistor Mn12. The transistor Mn11 and the transistor Mn9 form a current mirror for providing a bias current to the current comparison module based on a mirror structure. The transistor Mn12 is connected between the second current terminal of the transistor Mn8 and the first current terminal of the transistor Mn11, and the transistor Mn12 is used to control a branch, where the transistor Mn11 is located, to be turned on and turned off in accordance with the output voltage Vout. After short circuit occurs, with a continuous decrease of the output voltage Vout, the transistor Mn12 may be turned off, thus turning off the branch, where the transistor Mn11 is located, reducing the current flowing through the resistor Rs2, increasing the voltage at the inverting input terminal of the current comparator, achieving a purpose of resetting the flip threshold value of the current-limiting protection, and finally realizing the foldback current-limiting protection.

Further, the enable control module 324 is configured to control an operating state of the foldback control module 323 according to the current-limiting foldback control signal FB_ctrl. Further, the enable control module 324 comprises a current source 313, a current source 312, a transistor Mp8 and a transistor Mn13. The transistor Mn13 is connected in parallel with the transistor Mn12; the transistor Mp8 and the current source 313 are sequentially connected in series between the power supply voltage VCC and ground; a control terminal of the transistor Mp8 is used for receiving the current-limiting foldback control signal FB_ctrl; and the current source 312 is connected between the power supply voltage VCC and the control terminal of the transistor Mp8. The output detection circuit 340 maintains the current-limiting foldback control signal FB_ctrl in invalid state (i.e., maintaining the current-limiting foldback control signal FB_ctrl at low voltage level) before the output voltage Vout rises to a preset voltage value, the transistor Mp8 and the transistor Mn13 can be turned on to make the transistor Mn12 short circuited to prevent normal startup of the circuit from being affected by the foldback characteristic of the foldback current-limiting protection circuit 320 during the startup process of the circuit.

Figure 7:
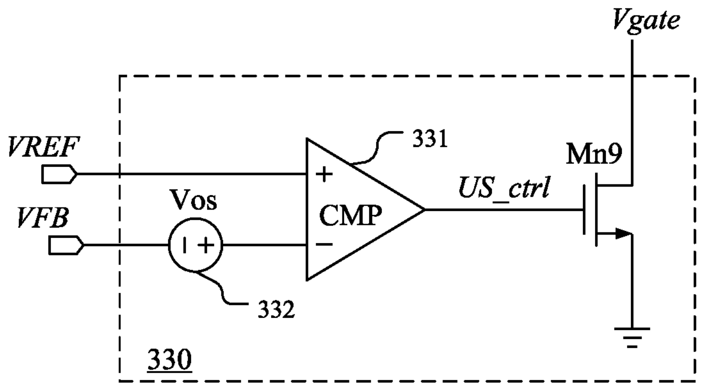
FIG. 7 shows a circuit diagram of an example of the undershoot suppression circuit in the low dropout linear regulator as shown in FIG. 4.

FIG. 7 shows one circuit diagram of an example of the undershoot suppression circuit in the low dropout linear regulator as shown in FIG. 4. As shown in FIG. 7, the undershoot suppression circuit 330 comprises a comparator 331, a voltage source 332 and a transistor Mn9. A non-inverting input terminal of the comparator 331 is used for receiving the reference voltage VREF, and an inverting input terminal of the comparator 331 is used for receiving the feedback voltage VFB via the voltage source 332, which provides a preset voltage Vos obtained according to the voltage limiting threshold value. The transistor Mn9 is connected between the control terminal of the power transistor Mpout and the ground, and a control terminal of the transistor Mn9 is connected to an output terminal of the comparator 331 to receive the undershoot suppression signal US_ctrl. When the feedback voltage VFB is equal to the reference voltage VREF, the undershoot suppression signal US_ctrl output by the comparator 331 is at low voltage level and the transistor Mn9 can be turned off. When a circuit undershoot event occurs, the feedback voltage VFB is lower than a voltage difference between the reference voltage VREF and the preset voltage Vos, the undershoot suppression signal US_ctrl outputted from the comparator 331 is at high voltage level, the transistor Mn9 can be turned on to pull the voltage Vgate at the control terminal of the power transistor Mpout to low voltage level, and the power transistor Mpout may pull the output voltage Vout to high voltage level, thereby realizing undershoot suppression function.

Further, the output detection circuit 340 is used for maintaining the undershoot suppression signal US_ctrl in invalid state (i.e., maintaining the undershoot suppression signal US_ctrl at low voltage level) before the output voltage Vout rises to the preset voltage value, so as to prevent the normal startup of the circuit from being affected by a maloperation of the undershoot suppression circuit during the startup process of the circuit.

It should be noted that the foldback current-limiting protection circuit and the undershoot suppression circuit in the above-mentioned embodiments are only examples for further explaining the operation principle of the output detection circuit in embodiments of the present disclosure. As will be understood by those of ordinary skill in the art, the output detection circuit of the embodiments of the present disclosure can also be applied to other low dropout linear voltage regulators, and the foldback characteristic of the foldback current-limiting protection circuit and the undershoot suppression circuit are disabled in the startup process of the circuit, so as to prevent normal startup process of the circuit from being affected by the foldback characteristic of the foldback current-limiting protection circuit and/or a maloperation of the undershoot suppression circuit.

In the above-described embodiments, each of the transistors Mp1-Mp8 is realized, for example, by a P-type MOSFET, and each of the transistors Mn1-Mn13 is realized, for example, by an N-type MOSFET.

Figure 8:
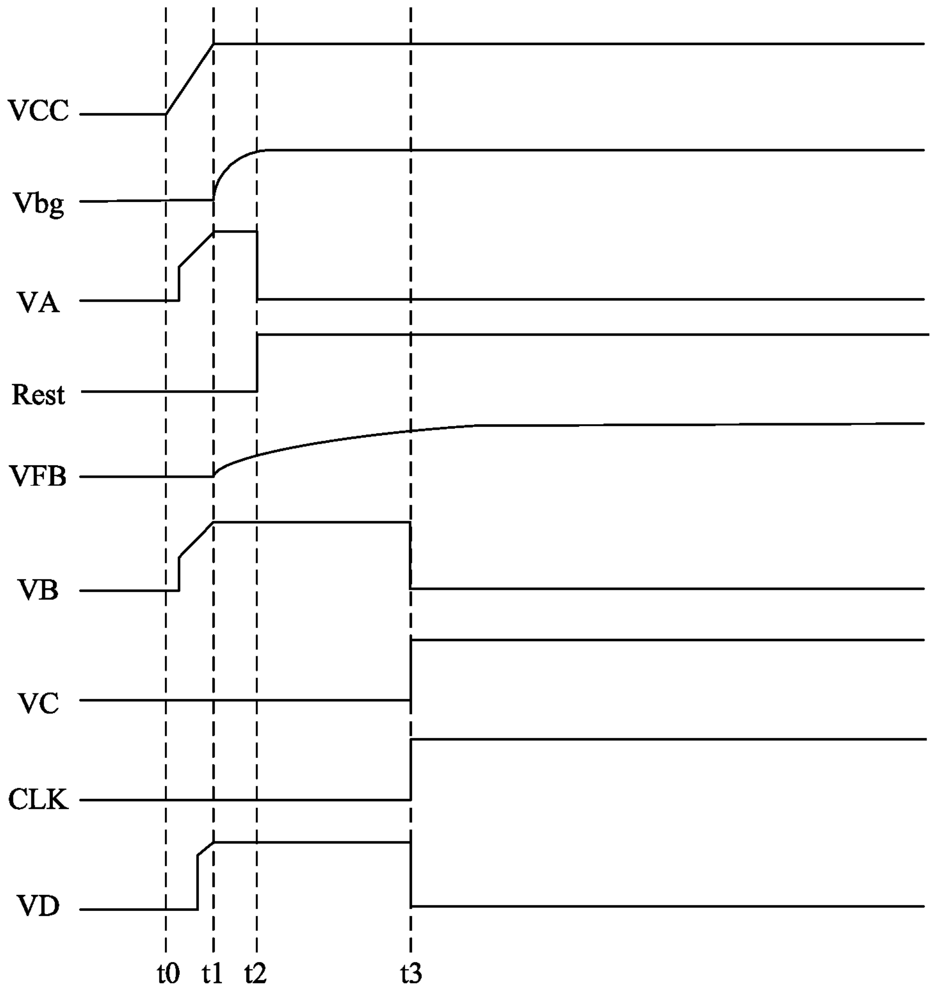
FIG. 8 shows a timing diagram of an output detection circuit of a low dropout linear regulator according to an embodiment of the present disclosure.

FIG. 8 shows a timing diagram of an output detection circuit of a low dropout linear regulator according to an embodiment of the present disclosure.

As shown in FIG. 8, during time period t0-t1, the circuit starts to power up, the power supply voltage VCC gradually rises, and the feedback voltage VFB can be at low voltage level. The transistor Mp1 starts to setup a current according to the supply voltage VCC, and the transistor Mp2 also generates a current based on a mirror structure. Since the setup speed of the band gap reference voltage is less than the setup speed of the current flowing through the transistor Mp1, the voltage VA at node A becomes a high-level voltage when the supply voltage VCC rises to a certain voltage, and the corresponding reset signal Rest becomes a low-level voltage during this time period. Since the feedback voltage VFB is lower than the turn-on threshold value of the transistor Mn3, the transistor Mn3 is turned off, the comparison signal VB output by the voltage comparator is at high voltage level, the voltage VC is at low voltage level, and the clock signal clk is at low voltage level. Since the reset signal Rest and the clock signal clk are at low voltage level, the logic control signal VD is at high voltage level, the transistors Mn5 and Mn6 can be turned on, and the undershoot suppression signal US_ctrl and the current-limiting foldback control signal FB_ctrl are pulled down to ground, respectively.

In the time period t1-t2, the startup process of the circuit has been completed, and the power supply voltage VCC remains unchanged. During this time period, the reference voltage Vbg gradually rises. When the reference voltage Vbg rises to a certain voltage (for example, at a moment corresponding to time t2), the voltage VA at node A is pulled down to low voltage level, and the reset signal Rest is flipped over to high voltage level. At this time, the feedback voltage VFB may still be lower than the turn-on threshold value of the transistor Mn3, so the comparison signal VB is still at high voltage level, the voltage VC at node C and the clock signal clk are at low voltage level, the logic control signal is maintained at high voltage level, the transistors Mn5 and Mn6 keeps operating under turn-on state, and the undershoot suppression signal US_ctrl and the current-limiting foldback control signal FB_ctrl can be pulled down to ground, respectively.

In the time period t2-t3, the feedback voltage VFB continues to increase. When the feedback voltage VFB rises to the turn-on threshold value of the transistor Mn3 (for example, at a moment corresponding to time t3), the transistor Mn3 can be turned on, and the comparison signal VB output by the voltage comparator is flipped to low voltage level. At this time, the voltage VC at node C is flipped to high voltage level, and the clock signal clk is also flipped to high voltage level. The flip-flop DFF transmits the power supply voltage VCC at the input terminal to the output terminal Q when a rising edge of the clock signal clk occurs, so that the output terminal Q can output a high-level voltage and the output terminal $\overline{Q}$ can output a low-level voltage, that is, the logic control signal VD is at low voltage level, and the transistors Mn5 and Mn6 can be turned off.

To sum up, in the low dropout linear regulator and the control circuit of the low dropout linear regulator according to embodiments of the present disclosure, the control circuit comprises an error amplifier, a foldback current-limiting protection circuit, a undershoot suppression circuit and an output detection circuit. The foldback current-limiting protection circuit is used for limiting an output current of a power transistor and perform short circuit protection, and the undershoot suppression circuit is used for grounding a control terminal of the power transistor when the output voltage undershoots.

Wherein, the output detection circuit is configured to judge whether the output voltage rises to a preset voltage value in the startup stage, and before the output voltage rises to the preset voltage value, the output detection circuit is configured to disable the undershoot suppression circuit and the foldback characteristic of the foldback current-limiting protection circuit, which not only prevents the normal startup of the circuit from being affected by maloperations of the folding current-limiting protection circuit and the undershoot suppression circuit during the startup process of the circuit, but also avoids the maloperation of the output detection circuit being caused by fluctuation of the output voltage when the circuit is normally operated, thus ensuring that the foldback current-limiting protection circuit and the undershoot suppression circuit can be started up normally in normal operating process of the chip, with high circuit stability and strong on-load startup ability.

It should be noted that although the device is described herein as some kind of N-channel or P-channel device, or some kind of N-type or P-type doped region, one of ordinary skill in the art will appreciate that complementary devices are also possible according to the present disclosure. Those of ordinary skill in the art can understand that the conductivity type is a mechanism that directs the generation of electricity, e.g., conduction through holes or electrons, and therefore the conductivity type relates not to the doping concentration but to the doping type, e.g., P-type or N-type. Those of ordinary skill in the art can understand that the terms "during," "when," and "at the time . . . " in connection with circuit operations are not strict terms for an action that occurs immediately at the beginning of the start-up action, but there may be some small but reasonable one or more delays between it and the reaction initiated by the start-up action, such as various transmission delays. As use herein, the terms "approximately" or "substantially" mean that the element has a parameter that is expected to be close to a declared value or position. However, as is well known in the art, there may always be minor deviations that make it difficult for the value or position to be strictly the same as the declared value. It has been properly determined in the art that, a deviation of at least ten percent (10%) (at least twenty percent (20%) for semiconductor doping concentration) is a reasonable deviation from a described accurate ideal target. When used in conjunction with a signal state, an actual voltage value or logic state of a signal (e.g., "1" or "0") depends on whether positive logic or negative logic is used.

It should be noted that relational terms, such as "first", "second", etc., are used herein only to distinguish one entity or operation from another and do not necessarily require or imply any such actual relationship or order between these entities or operations. Moreover, terms "including", "comprising" or any other variation thereof are intended to encompass non-exclusive inclusion, so that a process, method, article or equipment including a set of elements, may not only include those elements, but may also include other elements that are not explicitly listed, or may further include elements inherent to such process, method, article or equipment. In the absence of more limitations, an element limited by a statement "comprises a . . . " does not preclude an existence of another identical element in the process, method, article or equipment including said element.

The embodiments in accordance with the present disclosure are described above, and these embodiments neither exhaustively describe all the details nor limit the present disclosure to only specific embodiments. Obviously, many modifications and variations are possible in light of the above description. The present specification selects and specifically describes these embodiments to better explain the principle and practical use of the present disclosure, so that those skilled in the art may make good use of the present disclosure and modifications based on the present disclosure. The protection scope of the present disclosure should be based on the scope defined in the claims of the present disclosure.

What is claimed is:

1. A control circuit of a low dropout linear regulator, which comprises a power transistor connected between a power supply terminal and an output terminal, wherein the control circuit is configured to drive the power transistor to convert a power supply voltage at the power supply terminal into an output voltage, wherein the control circuit comprises:

an error amplifier, configured to drive the power transistor according to a voltage difference between a feedback voltage of the output voltage and a reference voltage;

a foldback current-limiting protection circuit, connected with a control terminal of the power transistor for performing foldback control on an output current of the power transistor and short circuit protection;

an undershoot suppression circuit, connected with the control terminal of the power transistor for pulling a voltage at the control terminal of the power transistor to low voltage level when the output voltage undershoots; and an output detection circuit, configured to judge whether the output voltage rises to a preset voltage value in a startup stage, and disable the undershoot suppression circuit and foldback control performed by the foldback current-limiting protection circuit before the output voltage rises to the preset voltage value.

2. The control circuit according to claim 1, wherein the foldback current-limiting protection circuit is configured to perform foldback control on a current-limiting threshold value according to a current-limiting foldback control signal in valid state and the output voltage when an input current flowing through the power transistor is greater than the current-limiting threshold value, so as to limit the output current to a lower current value.

3. The control circuit according to claim 2, wherein the undershoot suppression circuit is configured to generate the undershoot suppression signal in valid state when the feedback voltage is lower than a voltage limiting threshold value, and pull the voltage at the control terminal of the power transistor to low voltage level according to the undershoot suppression signal in valid state.

4. The control circuit according to claim 3, wherein the output detection circuit is configured to maintain the current-limiting foldback control signal and the undershoot suppression signal in invalid state before the output voltage rises to the preset voltage value.

5. The control circuit according to claim 4, wherein the output detection circuit comprises:

a reset signal generation module, configured to generate a reset signal according to the power supply voltage and a reference voltage;

a comparison module, configured to compare the feedback voltage of the output voltage with the preset voltage value to obtain a comparison result, and generate a comparison signal according to that comparison result;

a logic module, configured to generate a clock signal according to the comparison signal;

a control module, configured to perform a set operation according to the clock signal and a reset operation according to the reset signal, so as to generate a logic control signal, and control states of the current-limiting foldback control signal and the undershoot suppression signal according to the logic control signal.

6. The control circuit according to claim 5, wherein the reset signal generation module comprises:

a first transistor, a second transistor and a first resistor sequentially connected in series between the power supply terminal and the ground;

a third transistor and a fourth transistor sequentially connected in series between the power supply terminal and the ground; and a first inverter, wherein the first transistor and the third transistor form a current mirror, a control terminal of the second transistor is grounded, a control terminal of the fourth transistor is used for receiving the reference voltage, an input terminal of the first inverter is connected with the first current terminal of the fourth transistor, and an output terminal of the first inverter is used for providing the reset signal.

7. The control circuit according to claim 6, wherein the comparison module comprises a fifth transistor and a sixth transistor sequentially connected in series between the power supply terminal and the ground, wherein the fifth transistor forms a current mirror with the first transistor and the third transistor, a control terminal of the sixth transistor is used for receiving the feedback voltage, an intermediate node of the fifth transistor and the sixth transistor is used for providing the comparison signal, wherein the preset voltage value is equal to a turn-on threshold value of the sixth transistor.

8. The control circuit according to claim 7, wherein the logic module comprises second to fourth inverters sequentially connected in series, wherein an input terminal of the second inverter is connected to an intermediate node of the fifth transistor and the sixth transistor to receive the comparison signal, and an output terminal of the fourth inverter is used for providing the clock signal.

9. The control circuit according to claim 8, wherein the control module comprises:

a flip-flop, having an input terminal used for receiving the power supply voltage, a clock terminal used for receiving the clock signal, a reset terminal used for receiving the reset signal, and an output terminal used for outputting the logic control signal;

a seventh transistor, having a control terminal used for receiving the logic control signal, a first current terminal connected with the undershoot suppression circuit, and a second current terminal which is grounded; and an eighth transistor, having a control terminal used for receiving the logic control signal, a first current terminal connected to the foldback current-limiting protection circuit, a second current terminal which is grounded, wherein, the seventh transistor in turn-on state and the eighth transistor in turn-on state are used for grounding the undershoot suppression signal and the current-limiting foldback control signal, respectively.

10. The control circuit according to claim 9, wherein the output detection circuit further comprises a ninth transistor, having a control terminal connected with the output terminal of the flip-flop to receive the logic control signal, a first current terminal connected with the power supply terminal, and a second current terminal connected with an output terminal of the second inverter.

11. The control circuit according to claim 10, wherein the first transistor, the third transistor, the fifth transistor, and the ninth transistor are respectively metal oxide semiconductor field effect transistors of P type, the second transistor, the fourth transistor, the sixth transistor, the seventh transistor, and the eighth transistor are metal oxide semiconductor field effect transistors of N type, respectively.

12. The control circuit according to claim 2, wherein the foldback current-limiting protection circuit comprises:

a sampling transistor, configured to obtain a current sampling signal according to the input current;

a current comparison module, configured to compare the current sampling signal with a reference signal representing the current-limiting threshold value to obtain a comparison result, and obtain a current detection signal according to that comparison result;

a foldback control module, configured to adjust the reference signal according to the output voltage;

an overcurrent protection transistor, configured to control the voltage at the control terminal of the power transistor according to the current detection signal; and an enabling control module, configured to control an operating state of the foldback control module according to the current-limiting foldback control signal, wherein, when the current-limiting foldback control signal is in invalid state, the enabling control module is configured to disable the foldback control module according to the current-limiting foldback control signal in invalid state.

13. The control circuit according to claim 12, wherein the foldback current-limiting protection circuit further comprises: a bias module, configured to supply a bias current to the current comparison module.

14. The control circuit according to claim 13, wherein the current comparison module comprises tenth to fourteenth transistors, a second resistor, and a third resistor, wherein the tenth transistor and the eleventh transistor form a current mirror, first current terminals of the tenth transistor and the eleventh transistor are connected to a second terminal of the third resistor, a first terminal of the third resistor is connected to the power supply voltage, a first current terminal of the twelfth transistor is connected to a second current terminal of the tenth transistor, a control terminal is connected to a second terminal of the second resistor, a first terminal of the second resistor is connected to the power supply voltage, an intermediate node of the second resistor and the twelfth transistor is connected to the sampling transistor to receive the current sampling signal, a first current terminal of the thirteenth transistor is connected to a second current terminal of the eleventh transistor, a control terminal of the thirteenth transistor is connected to a first current terminal of the eleventh transistor, the first current terminal of the thirteenth transistor is used for providing the current detection signal, second current terminals of the twelfth transistor and the thirteenth transistor are both connected to a first current terminal of the fourteenth transistor, a second current terminal of the fourteenth transistor is grounded, the fourteenth transistor is configured to obtain the bias current through a mirror structure.

15. The control circuit according to claim 14, wherein the foldback control module comprises a fifteenth transistor and a sixteenth transistor sequentially connected in series between the second current terminal of the thirteenth transistor and ground, wherein, a control terminal of the fifteenth transistor is used for receiving the output voltage, and the sixteenth transistor is configured to obtain the bias current based on a mirror structure.

16. The control circuit according to claim 15, wherein the enable control module comprises:

a seventeenth transistor and a first current source connected in series between the power supply voltage and ground, a control terminal of the seventeenth transistor being used for receiving the current-limiting foldback control signal;

an eighteenth transistor connected in parallel with the fifteenth transistor, a control terminal of the eighteenth transistor being connected to an intermediate node of the seventeenth transistor and the first current source; and a second current source, having a first terminal connected to the power supply voltage and a second terminal connected to the control terminal of the seventeenth transistor.

17. The control circuit according to claim 16, wherein the tenth transistor, the eleventh transistor, and the seventeenth transistor are each implemented by a metal oxide semiconductor field effect transistor of P type, the twelfth to sixteenth transistors and the eighteenth transistor are each implemented by a metal oxide semiconductor field effect transistors of N type.

18. A low dropout linear voltage regulator, comprising:

a power transistor, connected in series between the power supply terminal and the output terminal; and the control circuit according to claim 1, configured to drive the power transistor to convert the power supply voltage at the power supply terminal into the output voltage.

* * * * *